United States Patent
Yan et al.

(10) Patent No.: US 11,379,830 B2
(45) Date of Patent: *Jul. 5, 2022

(54) METHOD FOR EXECUTING SMART CONTRACT, BLOCKCHAIN NODE, AND STORAGE MEDIUM

(71) Applicant: Alipay (Hangzhou) Information Technology Co., Ltd., Zhejiang (CN)

(72) Inventors: Ying Yan, Zhejiang (CN); Changzheng Wei, Zhejiang (CN); Xuepeng Guo, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,998

(22) Filed: Jun. 18, 2021

(65) Prior Publication Data

US 2022/0067721 A1 Mar. 3, 2022

(30) Foreign Application Priority Data

Aug. 31, 2020 (CN) .......................... 202010899207.2

(51) Int. Cl.
*G06Q 20/38* (2012.01)
*H04L 9/32* (2006.01)
(Continued)

(52) U.S. Cl.
CPC ......... *G06Q 20/3825* (2013.01); *G06F 8/425* (2013.01); *G06F 8/4441* (2013.01);
(Continued)

(58) Field of Classification Search
None
See application file for complete search history.

(56) References Cited

U.S. PATENT DOCUMENTS 10,733,152 B2   8/2020   Sun
2003/0217087 A1 11/2003  Chase et al.
(Continued)

FOREIGN PATENT DOCUMENTS

CN   106133684 A   11/2016
CN   108196872 A   6/2018
(Continued)

OTHER PUBLICATIONS

Ayoade et al., "Smart Contract Defense Through Bytecode Rewriting", IEEE International Conference on Blockchain (Blockchain), 2019, 6 pages.
(Continued)

*Primary Examiner* — Qing Chen
(74) *Attorney, Agent, or Firm* — Seed IP Law Group LLP

(57) ABSTRACT

The present specification provides a method for executing a smart contract, a blockchain node, and a storage medium. An implementation of a method for executing a smart contract includes: receiving, by a blockchain node, a request for creating a smart contract, the request including a bytecode of the smart contract; starting, by the blockchain node after completing deployment of the smart contract, to compile the bytecode of the smart contract into a first machine code by using ahead-of-time compilation and storing the machine code; and performing, by the blockchain node in execution of the deployed smart contract and in response to the first machine code of the smart contract not being locally stored, JIT compilation on the bytecode of the smart contract to obtain a second machine code and storing the second machine code, and executing the second machine code.

20 Claims, 8 Drawing Sheets

A blockchain node receives a request for creating a smart contract, the request including a bytecode of the smart contract — S601

After completing deployment of the smart contract, the blockchain node starts to compile the bytecode of the smart contract into a first machine code by using ahead-of-time (AoT) compilation and stores the machine code — S603

In execution of the deployed smart contract and in response to that a first machine code of the smart contract is not locally stored, the blockchain node performs JIT compilation on a bytecode of the smart contract to obtain a second machine code and stores the second machine code, and executes the second machine code — S605

(51) Int. Cl.
  *G06F 8/41*      (2018.01)
  *G06F 9/455*     (2018.01)

(52) U.S. Cl.
  CPC ..... *G06F 9/4552* (2013.01); *G06Q 20/38215* (2013.01); *H04L 9/3242* (2013.01); *H04L 9/3247* (2013.01); *H04L 2209/38* (2013.01); *H04L 2209/56* (2013.01)

(56) References Cited

U.S. PATENT DOCUMENTS

| | | |
|---|---|---|
| 2012/0185833 A1 | 7/2012 | Oh et al. |
| 2016/0085532 A1 | 3/2016 | Pirvu |
| 2018/0089760 A1 | 3/2018 | Stradling et al. |
| 2019/0172285 A1 | 6/2019 | Jin |
| 2019/0281065 A1 | 9/2019 | Xia et al. |
| 2019/0303892 A1 | 10/2019 | Yantis et al. |
| 2019/0303926 A1 | 10/2019 | Yantis et al. |
| 2020/0019421 A1* | 1/2020 | Sun ................. H04L 9/0637 |
| 2020/0034453 A1 | 1/2020 | Sato et al. |
| 2020/0117493 A1* | 4/2020 | Wang ............... G06F 9/45533 |
| 2020/0117611 A1* | 4/2020 | Li ................. G06F 9/44557 |
| 2020/0167503 A1* | 5/2020 | Wei ................. G06F 21/64 |
| 2020/0169557 A1* | 5/2020 | Liu ................. H04L 9/3234 |
| 2020/0174937 A1 | 6/2020 | Yao |
| 2020/0250663 A1 | 8/2020 | Abad et al. |
| 2020/0293297 A1 | 9/2020 | Chan et al. |
| 2020/0294009 A1* | 9/2020 | Qing ............... G06Q 20/3678 |
| 2020/0364703 A1 | 11/2020 | Joveski et al. |
| 2021/0035212 A1 | 2/2021 | Chan et al. |
| 2021/0099283 A1 | 4/2021 | Schvey et al. |
| 2021/0119918 A1 | 4/2021 | Munson et al. |
| 2021/0119994 A1 | 4/2021 | Shekh-Yusef et al. |
| 2021/0150524 A1 | 5/2021 | Yan et al. |
| 2021/0224378 A1* | 7/2021 | Krey ................. G06F 9/45558 |

FOREIGN PATENT DOCUMENTS

| | | |
|---|---|---|
| CN | 110032883 A | 7/2019 |
| CN | 110033368 A | 7/2019 |
| CN | 110096338 A | 8/2019 |
| CN | 110569108 A | 12/2019 |
| CN | 110675256 A | 1/2020 |
| CN | 110688122 A | 1/2020 |
| CN | 110825363 A | 2/2020 |
| CN | 111045792 A | 4/2020 |
| CN | 111061484 A | 4/2020 |
| CN | 111078318 A | 4/2020 |
| CN | 111179086 A | 5/2020 |
| CN | 111381938 A | 7/2020 |
| CN | 111399990 A | 7/2020 |
| EP | 3123316 A1 | 2/2017 |
| WO | WO 2019034959 A1 | 2/2019 |

OTHER PUBLICATIONS

Wang et al., "An Overview of Smart Contract: Architecture, Applications, and Future Trends", IEEE Intelligent Vehicles Symposium (IV), Cahngshu, Suzhou, China, Jun. 2018, 6 pages.

"BM is about to launch the WASM interpreter, which has been tested, interpreted and executed, and compiled and executed," 0-Daily Planet News, Aug. 30, 2018, 2 pages, https://www.36kr.com/p/1722795409409.

"How is java from source code to bytecode to machine code implemented," CSDN, Jan. 14, 2019, 4 pages, https://blog.csdn.net/zhu_ya_nan/article/details/86472206?utm_medium=distribute.pc_aggpage_search_result.none-task-blog-2%7Eall%7Efirst_rank_v2%7Erank_v25-1-86472206.nonecase&utm_term=%E5%AD%97%E8%8A%82%E7%A0%81%E8%BD%AC%E6%9C%BA%E5%99%A8%E7%A0%81&spm=1000.2123.3001.4430%E3%80%8B.

"Java execution engine (from bytecode to machine code)", CSDN, Mar. 1, 2019, 5 pages, https://blog.csdn.net/u013688541/article/details/88053186?utm_medium=distribute.pc_aggpage_search_result.none-task-blog-2%7Eall%7Esobaiduend%7Edefault-4-88053186.nonecase&utm_term=%E5%AD%97%E8%8A%82%E7%A0%81%E8%BD%AC%E6%9C%BA%E5%99%A8%E7%A0%81&spm=1000.2123.3001.4430%E3%80%8B.

Zheng, Zibin et al., "An Overview on Smart Contracts: Challenges, Advances and Platforms", Future Generation Computer Systems, Elsevier Science Publishers, Amsterdam, NL, vol. 105, Dec. 17, 2019, 17 pages.

"Celer Network: Bring Internet Scale to Every Blockchain", ScaleSphere Foundation Ltd. ("Foundation"), Jun. 15, 2018, 68 pages, https://arxiv.org/abs/1810.00037.

Hearn, Mike et al., "Corda: A Distributed Ledger", Aug. 20, 2019, 73 pages. https://www.corda.net/content/corda-technical-whitepaper.pdf.

* cited by examiner

METHOD FOR EXECUTING SMART CONTRACT, BLOCKCHAIN NODE, AND STORAGE MEDIUM

BACKGROUND

Technical Field

Implementations of the present specification pertain to the field of blockchain technologies, and in particular, to a method for executing a smart contract, a blockchain node, and a storage medium.

Description of the Related Art

A blockchain is a new application mode of computer technologies such as distributed data storage, point-to-point transmission, a consensus mechanism, and an encryption algorithm. In the 2.0 era of the blockchain, a smart contract appears, which greatly expands the application range of the blockchain. With a smart contract, a blockchain can invoke a segment of code that can be customized by a user, instead of performing only transfer transactions.

BRIEF SUMMARY

The present specification provides a method for executing a smart contract, a blockchain node, and a storage medium.

Implementations of the present specification provide a method for executing a smart contract, a blockchain node, and a storage medium, which are implemented in the following methods:

A method for executing a smart contract includes: receiving, by a blockchain node, a request for creating a smart contract, the request including a bytecode of the smart contract; starting, by the blockchain node after completing deployment of the smart contract, to compile the bytecode of the smart contract into a first machine code by using ahead-of-time (AoT) compilation and storing the first machine code; and performing, by the blockchain node in execution of the deployed smart contract and in response to that a first machine code of the smart contract is not locally stored, just-in-time (JIT) compilation on a bytecode of the smart contract to obtain a second machine code and storing the second machine code, and executing the second machine code.

A method for executing a smart contract includes: starting, by a blockchain node after completing deployment of a smart contract, to compile a bytecode of the smart contract into a first machine code by using AoT compilation and storing the first machine code; and performing, by the blockchain node in execution of the deployed smart contract and in response to that a first machine code of the smart contract is not locally stored, JIT compilation on a bytecode of the smart contract to obtain a second machine code and storing the second machine code, and executing the second machine code.

A blockchain node for executing a smart contract performs the above method.

A blockchain node for executing a smart contract includes: a processor; and a memory storing a program, where the above method is performed when the processor executes the program.

A storage medium is used for storing a program, where the program performs an operation of the above method when executed.

According to the above implementations of the present specification, after the bytecode of the smart contract is deployed on the blockchain, AoT compilation is started on the machine code of the smart contract. If a request for invoking the smart contract is received, JIT compilation execution is performed on the bytecode of the smart contract in response to that the machine code of the smart contract is not stored locally, that is, in response to that AoT compilation is not completed. Therefore, normal processing of a blockchain service request can be ensured while AoT compilation is performed. In addition, each node in the blockchain performs AoT compilation locally for a bytecode of the same smart contract, and each node only needs to adjust its processor architecture, running environment, etc., and does not need to compile multiple different versions of machine codes. As such, a size of a machine code stored on a node device is greatly reduced, so storage overheads can be reduced.

BRIEF DESCRIPTION OF THE SEVERAL VIEWS OF THE DRAWINGS

To describe the technical solutions in the implementations of the present specification more clearly, the following briefly describes the accompanying drawings needed for describing the implementations. Clearly, the accompanying drawings in the following description show merely some implementations of the present specification, and a person of ordinary skill in the art can still derive other drawings from these accompanying drawings without creative efforts.

DETAILED DESCRIPTION

Figure 1:
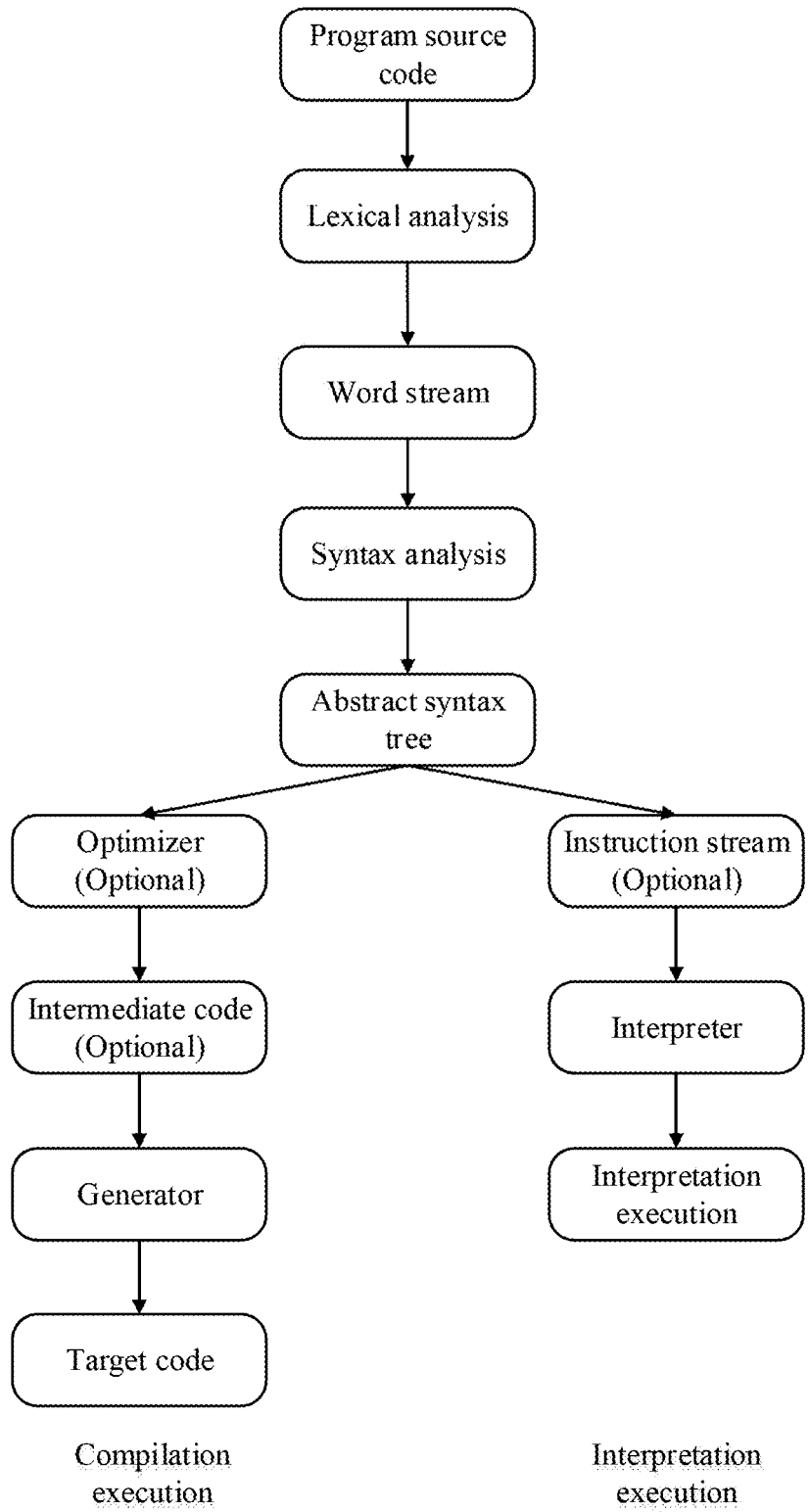
FIG. 1 is a schematic diagram illustrating principles of compilation execution and interpretation execution according to an implementation.

To make a person skilled in the art better understand the technical solutions in the present specification, the following clearly describes the technical solutions in the implementations of the present specification with reference to the accompanying drawings in the implementations of the present specification. Clearly, the described implementations are merely some but not all of the implementations of the present specification. Based on the implementations of the present specification, a person skilled in the art can obtain other implementations without making creative efforts, which all fall within the scope of the present specification.

The 1.0 era of the blockchain usually refers to the development phase of blockchain applications represented by bitcoins between 2009 and 2014. They were devoted to decentralization of currency and payment means. Starting from 2014, developers are increasingly focused on addressing the technical and scalability deficiencies of bitcoins. At the end of 2013, Vitalik Buterin released the whitepaper *Ethereum: A next-generation smart contract and decentralized application platform*, which introduced the smart contract into the blockchain and started the application of the blockchain outside the currency field, thus opening the 2.0 era of the blockchain.

A smart contract is a computer contract that can be executed automatically based on a specified trigger rule, and can also be considered as a digital version of a conventional contract. The concept of smart contract was first proposed by the cross-domain legal scholar and cryptography researcher Nick Szabo in 1994. This technology was not used in the real world due to a lack of programmable digital systems and related technologies until the blockchain technology and Ethereum emerged and provided reliable execution environments. Due to a blockchain ledger used in the blockchain technology, generated data cannot be tampered with or deleted, and the entire ledger will continuously have more ledger data, thus ensuring traceability of historical data. In addition, a decentralized operation mechanism avoids impact of centralization factors. The smart contract based on the blockchain technology not only gives full play to the advantages of the smart contract in terms of cost and efficiency, but also prevents malicious behavior from interfering with normal contract execution. A smart contract is digitized into a blockchain, and features of the blockchain technology ensure that a whole process of storage, reading, and execution is transparent and traceable, and cannot be tampered with.

The smart contract is essentially a program that can be executed by a computer. The smart contract can be written in a high-level language (such as C language or C++ language), like a computer program widely used today. A program code of the smart contract written in a high-level language can be generally converted into a "machine code" that can be identified and run by a CPU of a computer by using a "compiler," and then such a machine code (also referred to as a "microprocessor instruction") can be executed by the CPU. This method is generally referred to as "compilation execution."

Compilation execution generally does not have cross-platform scalability. There are different manufacturers, different brands, and different generations of CPUs, and instruction sets supported by these different CPUs are different in many scenarios, such as x86 instruction sets and ARM instruction sets, and instruction sets supported by the same manufacturer's same brand but different generations of CPUs (such as different generations of Intel CPUs) are different. Therefore, the same program code written in the same high-level language can have different machine codes converted by the compiler from different CPUs. For example, in the process of converting a program code written in a high-level language to a machine code, the compiler performs optimization with reference to features of a specific CPU instruction set (for example, a vector instruction set) to improve a speed of program execution, and such optimization is often related to specific CPU hardware. In this case, the same machine code can run on an x86 platform, but cannot run on an ARM platform. Even on the same x86 platform, the instruction set is enriched and expanded over time, which results in different generations of x86 platforms running different machine codes. In addition, because execution of the machine code requires a kernel of an operating system to schedule the CPU, even if the same hardware is used, machine codes that can be run in different operating systems can be different.

Unlike compilation execution, there is also an "interpretation execution" program running method. For example, for Java language, a Java source code is compiled into a standard bytecode by using a Java compiler, where the compiler defines an abstract standard instruction set instead of an instruction set specific to any actual hardware processor. Generally, the compiled standard bytecode cannot run directly on a hardware CPU. Therefore, a virtual machine, that is, a Java virtual machine (JVM), is introduced, and the JVM runs on a specific hardware processor to interpret and execute the compiled standard bytecode.

The JVM is a virtual computer and is usually implemented by simulating various computer functions on an actual computer. The JVM shields information related to specific hardware platforms and operating systems, so the Java program can run on multiple platforms without modification just by generating the standard bytecode that can run on the JVM.

A very important feature of Java is its independence from platforms. The JVM is the key to realizing this feature. To run on different platforms, a common high-level language needs to be compiled into at least different target codes. After the JVM is introduced, Java language does not need to be recompiled when running on different platforms. Java language shields information related to a specific platform by using a JVM, so the Java language compiler can run on multiple platforms without modification only by generating a target code (byte code) running on the JVM. When executing a bytecode, the JVM interprets the bytecode as a machine instruction on a specific platform for execution. This is why Java can be "compiled once, run everywhere."

The JVM runs on a specific hardware processor and is responsible for bytecode interpretation and execution for the running specific processor, shields differences of these underlying layers, and presents standard development specifications to developers. When executing a bytecode, the JVM actually interprets the bytecode as a machine instruction on a specific platform for execution. For example, after receiving input bytecodes, the JVM interprets each instruction in the bytecodes statement by statement, and interprets the instruction into a machine code suitable for a current machine to run. These processes are, for example, interpreted and executed by an interpreter. As such, a developer who writes a Java program does not need to consider which hardware platform the program code will run on. The JVM is developed by professional developers of the Java organization to adapt to different processor architectures. To date, there are only a limited number of mainstream processor architectures, such as X86, ARM, RISC-V, and MIPS. After professional developers implant the JVM to a platform that supports these specific hardware, the Java program can run on all machines in theory. JVM implantation is usually provided by professionals of the Java development organization, which greatly reduces the burden on Java application developers.

Interpretation execution brings portability across platforms. However, because execution of the bytecode undergoes an intermediate interpretation process of the JVM, execution efficiency is not as high as that of the above compilation execution, and this difference in efficiency can sometimes even be tens of times.

FIG. 1 illustrates common points and different points of compilation execution and interpretation execution. Regardless of compilation execution or interpretation execution, and regardless of a physical machine or a virtual machine, for an application program, a machine cannot read, understand, and then obtain the ability to execute as a human does. Most program codes go through the steps in FIG. 1 before becoming target codes on a physical machine or an instruction set that a virtual machine can execute. The branch from the top to the left in FIG. 1 is a process of generating program codes to obtain target machine codes in a conventional compilation principle, and the branch from the top to the right is an interpretation execution process. Nowadays, most languages based on physical machines and JVMs, or other high-level language virtual machines (HLLVM) other than Java follow this idea based on a modern classical compilation principle: Before execution, lexical analysis and syntax analysis processing are performed on program source codes, and the source codes are converted into an abstract syntax tree (AST). For implementation of a specific language, lexical analysis, syntax analysis, and subsequent optimizers and target code generators can be implemented independently of an execution engine, forming a compiler of a complete meaning, and such a language is represented by C/C++ language. Or some of these steps (such as those before the generation of the abstract syntax tree) can be implemented as a semi-independent compiler, and such a language is represented by Java. Or these steps and execution engines are all centrally encapsulated in a closed black box, such as most JavaScript executors.

To ensure both cross-platform portability and high performance, the concept of just-in-time compiler (JIT) is proposed. The core idea of JIT is "how to efficiently avoid repeatedly interpreting instructions." There are a large number of codes that are repeatedly executed in a computer program, for example, some compute "functions" can be cyclically invoked many times in a program execution process. During interpretation execution, bytecode to machine code interpretation is required for each execution of the loop process. However, actually, machine codes generated by this function in dozens of times of interpretation are identical. Naturally, after the first time of interpretation, the interpreted machine code of the function is cached. In a subsequent execution process, the cached code is directly used without further interpretation. As such, execution efficiency can be improved.

On the contrary, some functions are executed only once in the process of a program running cycle (for example, starting initialization), so such functions do not need to be cached and can be directly interpreted and executed once. Therefore, a core module in the JIT technology is "hotspot analysis," which is used to analyze which codes are executed multiple times in a program execution process, so as to cache interpreted machine codes for the codes. An operation executed for a relatively small quantity of times does not need to be cached. As such, optimal balance can be achieved between execution efficiency and memory overhead.

In addition, another core module in the JIT technology is compilation optimization (also referred to as optimizing compilation). A directly interpreted machine code is not optimized according to the context. Performance improvement is limited when high-frequency machine codes are only cached. Further optimization on the compiler can be performed to obtain better performance. Relatively, more time is generally required to implement compilation optimization.

Figure 2:
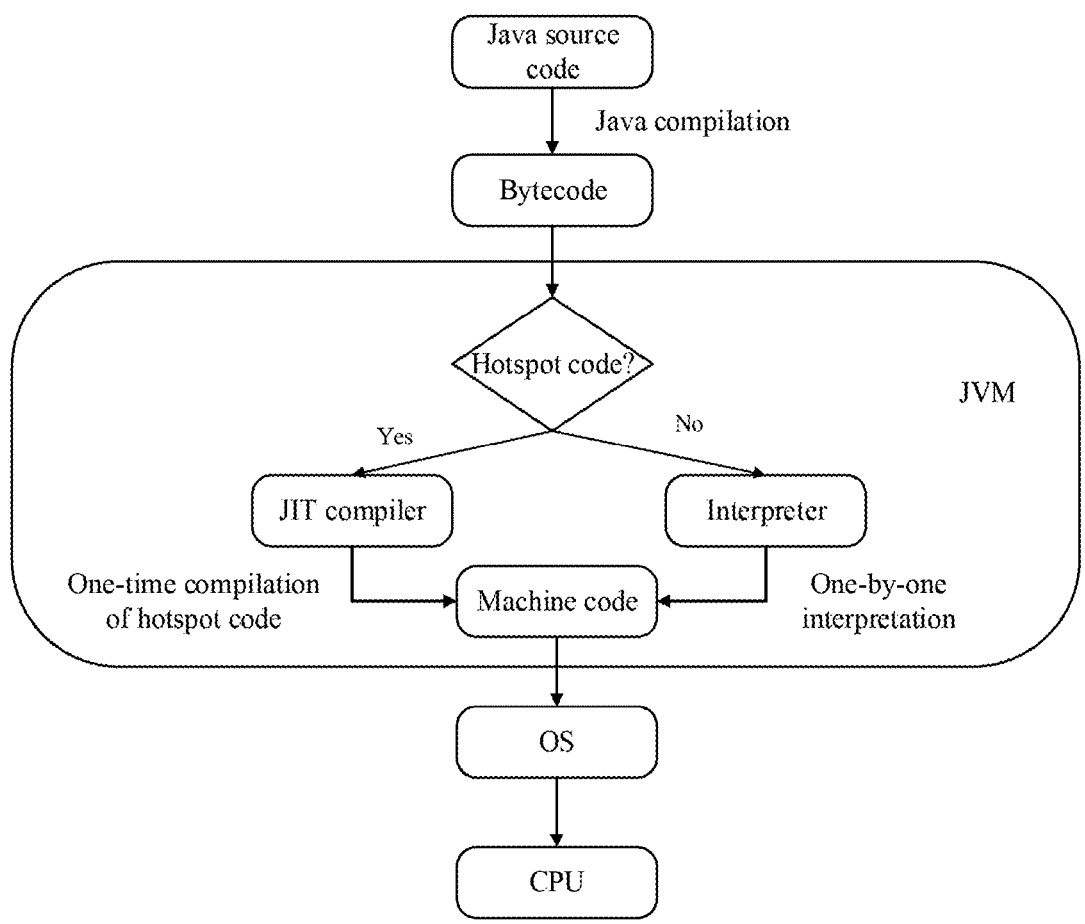
FIG. 2 is a schematic diagram illustrating principles of interpretation execution and JIT according to an implementation.

For example, a working principle of the JIT is shown in FIG. 2. After a Java compiler compiles Java source codes, a segment of Java bytecode is generated. After hot analysis, the Java bytecode is distributed to two execution paths (JIT compiler and interpreter). A code determined as a hotspot (high-frequency execution) is compiled in the JIT compiler to obtain a machine code, cached, and executed, and is generally executed by a CPU under control of an operating system (OS). A low-frequency code enters the interpreter, is interpreted as a machine code, and executed by a CPU under control of an OS.

Because of a correlation between program codes, there is a relatively large optimization space in a compilation process. An optimized machine code can be executed more efficiently than a directly interpreted machine code. Compiler optimization is necessary if better performance is to be achieved. The compilation process of the JIT compiler can be time consuming. In particular, the JIT compiler can take a long time to compile bytecodes for the first time, even delivering poor performance than that of interpretation execution. Therefore, for some Java programs, if a hotspot is not very obvious, that is, overall execution frequency is not very high, and an overall execution procedure is very long, the JIT can hardly exert advantages of compilation execution.

In addition, another idea is proposed: ahead-of-time (AoT) compilation. AoT compilation is equivalent to a pre-compilation execution method. Before a program runs, a bytecode is compiled once for a target execution environment to obtain a machine code, and then the machine code is deployed on a target machine for execution. Running efficiency of AoT can achieve the same effect of compilation execution. However, when AoT is used, it is required to clearly know hardware of a target system, an instruction set architecture, a system, etc., so as to ensure that compiled codes can run. In addition, generally, for an instruction of a same function, a quantity of statements required for expression using a machine code is larger than that using a bytecode, and farther larger than that using codes written in a high-level language. Therefore, for a program of same content, it is likely that the size of machine codes>the size of bytecodes>the size of high-level language codes. If the hardware, instruction set architecture, system, etc., of the target system are clearly known, the bytecode can be compiled into the machine code by using AoT compilation. In addition, machine codes of different types of target systems are different, so it can be necessary to make all different versions of machine codes available in order to have corresponding correctly executed machine codes on the various target systems. As such, a total size of machine codes is generally larger than that of bytecodes or high-level language codes.

For example, Android uses the Dalvik virtual machine before version 5.0, and uses the Android Runtime (ART) virtual machine after version 5.0. Dalvik uses the JIT compiler to interpret bytecodes, while ART uses the AoT mechanism. In the ART mode, a bytecode is pre-compiled during application program installation (the installation process of an Android app is actually installing the bytecode of the program) into a machine code. After the process of interpreting the code is removed, the application program on Android is executed more efficiently and starts more quickly.

In a decentralized distributed system in a blockchain, distribution consistency needs to be maintained. For example, in a group of nodes in the distributed system, a state machine is built in each node. Each state machine needs to execute a same instruction in a same order from a same initial state to keep a same change of each state, so as to finally ensure a consistent state. However, all node devices involved in a same blockchain network can hardly have same hardware configuration and software environments. Therefore, an Ethereum virtual machine (EVM), similar to a JVM, is used in the representative Ethereum in blockchain 2.0 to ensure that processes and results of executing a smart contract on each node are the same. Differences between the hardware configuration and software environments of each node can be shielded through the EVM. In this case, a developer can develop a code of a smart contract, and upload a compiled bytecode of the smart contract to a blockchain after the developer locally compiles the code of the smart contract. After each node interprets and executes a same bytecode by using a same initial state and by using a same EVM, a same final result and a same intermediate result can be obtained, and hardware and environment differences at lower layers of different nodes can be shielded. As such, the emergence of the decentralized blockchain technology enables the smart contract proposed earlier in 1994 to be implemented. In addition, the implementation of decentralization inevitably faces differences between hardware and running environments of different execution machines, and the smart contract is further processed by means of interpretation execution, so as to ensure that a same execution result can be obtained on a plurality of different decentralized hardware and running environments.

The EVM is a Turing-complete virtual machine, which means that a variety of complex logic can be implemented through it, which is also one of the greatest improvements of Ethereum to blockchain 1.0 as a representative of blockchain 2.0. A user can publish and invoke a smart contract on an EVM in Ethereum. As mentioned above, the EVM directly runs a bytecode, and the smart contract deployed on the blockchain can be in the form of a bytecode.

Figure 3:
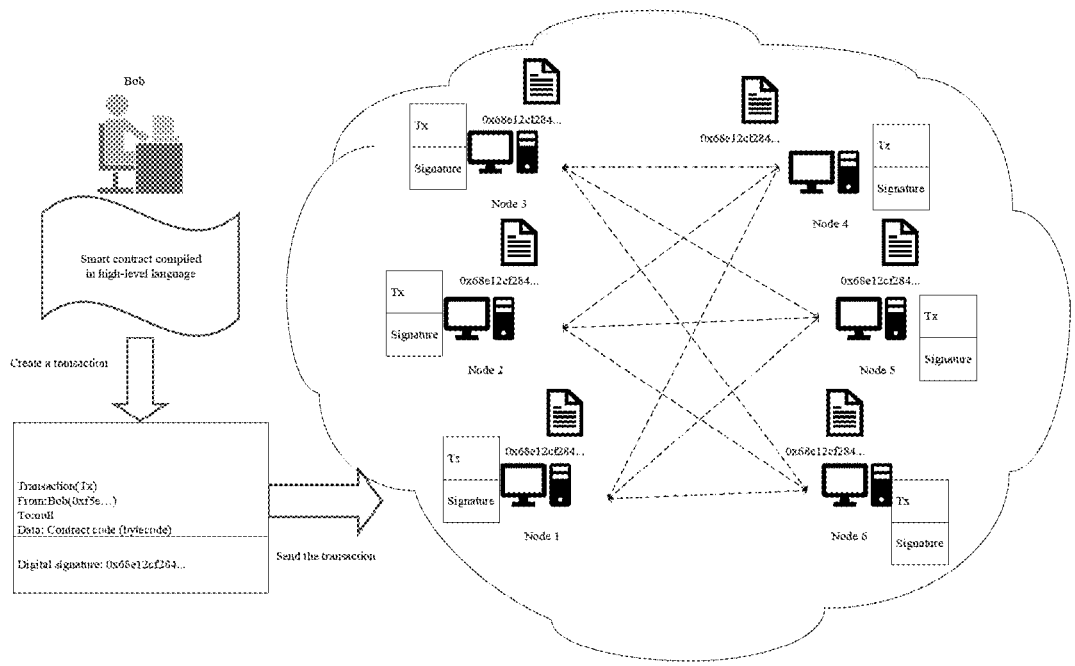
FIG. 3 is a graphical process of creating a smart contract according to an implementation.

As shown in FIG. 3, after "Bob" sends a transaction containing information about creating a smart contract to an Ethereum network, an EVM of node 1 can execute the transaction and generate a corresponding contract instance. A "data" field of the transaction can store a bytecode, and a "to" field of the transaction can be an empty address. After consensus is reached among nodes through a consensus mechanism, the contract is successfully created. Subsequently, a user can invoke the contract.

After the contract is created, a contract account corresponding to the smart contract appears on the blockchain and has a specific address, and a contract code and account storage are stored in the contract account. Behavior of the smart contract is controlled by the contract code, and the account storage of the smart contract keeps a contract status. In other words, the smart contract causes a virtual account including the contract code and account storage to be generated on the blockchain.

As mentioned above, a "data" field of the transaction containing information about creating a smart contract can store the bytecode of the smart contract. The bytecode consists of a series of bytes. Each byte can indicate one operation. Based on development efficiency, readability, etc., developers can choose not to write bytecodes directly, but choose high-level languages to write smart contract codes. A smart contract code written in a high-level language is compiled by a compiler to generate a bytecode, which can then be deployed on a blockchain. Ethereum supports many high-level languages, such as Solidity, Serpent, and LLL.

The Solidity language is used as an example. Contracts compiled by using the Solidity language are similar to the Class in an object-oriented programming language. Multiple members can be specified in a contract, including a status variable, a function, a function modifier, an event, etc. The status variable is a value that is permanently stored in the account storage of the smart contract and is used to store the status of the contract.

The following describes code example 1 of a simple smart contract written in the Solidity language:

```
Contract Example{
    int balance;
    function C( ){
        balance + = 1;
    }
    function getblance( ) returns(int){
        return balance;
    }
}
```

Generally, after the contract is deployed in the blockchain, the status variable "balance" can be an asset type newly defined in the contract. Function C( ) defines a change operation of balance. Function getbalance( ) returns(int) defines an operation that takes a value of the current balance and returns it.

Figure 4:
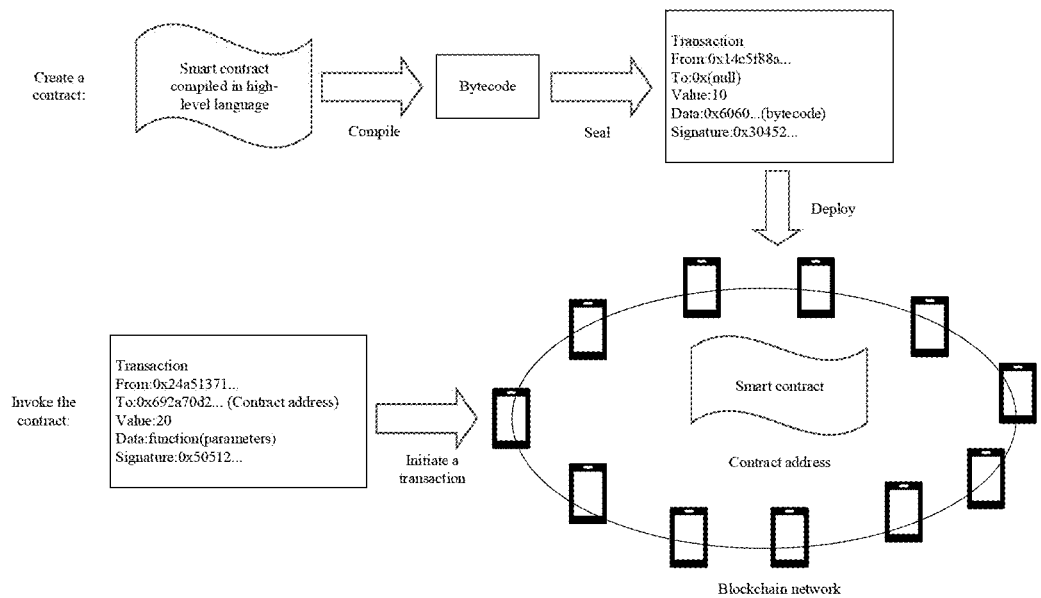
FIG. 4 is a graphical process of invoking a smart contract according to an implementation.

In addition, as shown in FIG. 4, Ethereum is still used as an example. After "Bob" sends a transaction containing information about invoking a smart contract to the Ethereum network, the EVM of node 1 can execute the transaction and generate a corresponding contract instance. In FIG. 4, a "from" field of the transaction is an address of an account that initiates invoking of the smart contract, "0x692a70d2 . . . " in the "to" field represents an address of the invoked smart contract, a "value" field is an ETH value in Ethereum, and a "data" field of the transaction stores a method and a parameter for invoking the smart contract. After the smart contract is invoked, the value of balance can change. Subsequently, a client can view the current value of balance through a blockchain node.

The smart contract can be executed independently on each node in the blockchain network in a specified method, and all execution records and data are stored in the blockchain. Therefore, after such a transaction is completed, transaction vouchers that cannot be tampered with and will not be lost are stored in the blockchain.

Figure 5:
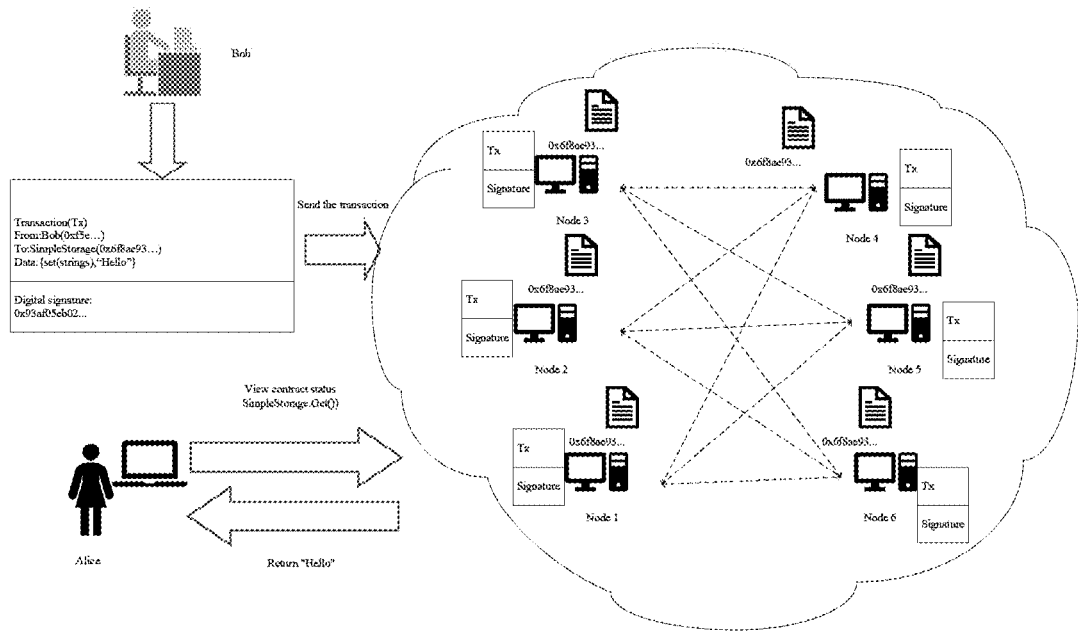
FIG. 5 is a schematic diagram of creating a smart contract and invoking the smart contract according to an implementation.

A schematic diagram of creating a smart contract and invoking a smart contract is shown in FIG. 5. Creating a smart contract in Ethereum requires the following processes: compiling the smart contract, changing the smart contract into bytecodes, and deploying the bytecodes to the blockchain. Invoking a smart contract in Ethereum is to initiate a transaction pointing to an address of the smart contract (the address of the smart contract can be pointed to by using the "to" field in the transaction). Codes of the smart contract are distributed in a virtual machine of each node in the Ethereum network.

Figure 9:
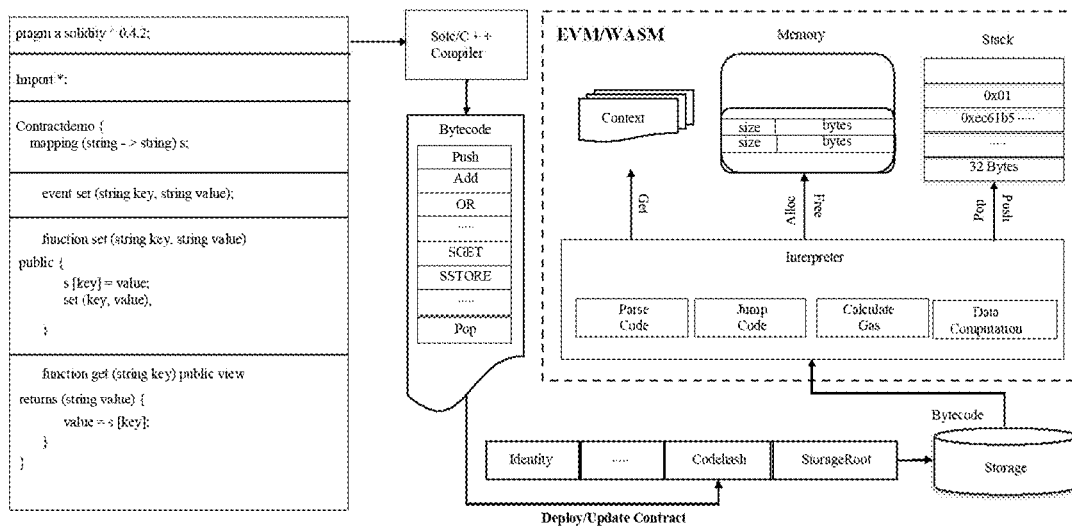
FIG. 9 is a schematic diagram illustrating a virtual machine execution process included in the process of creating a smart contract and invoking the smart contract according to an implementation.
Figure 10:
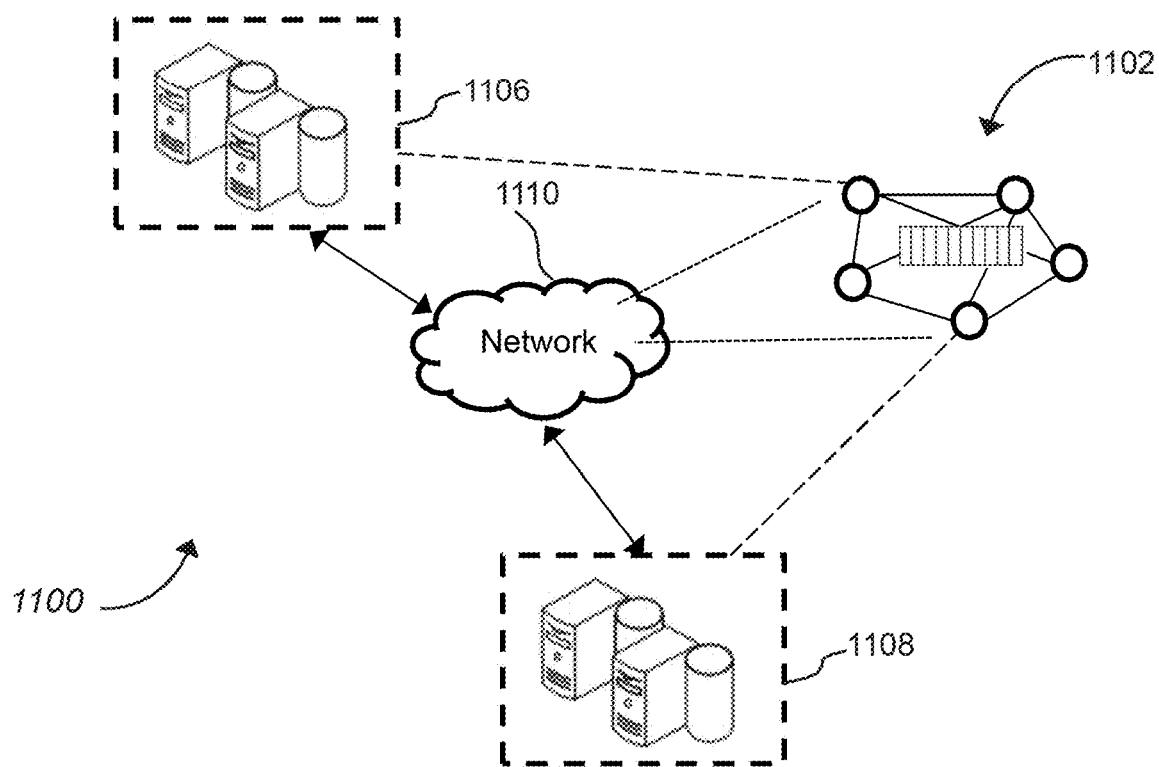
FIG. 10 is a diagram illustrating example environments that can be used to execute embodiments of this specification.

The transaction for creating a smart contract is sent to the blockchain network. After consensus is reached, nodes of the blockchain network can execute the transaction. For example, the transaction can be executed by the EVM/WASM of the blockchain node. As previously mentioned, a contract account corresponding to the smart contract (including, for example, an identity of the account, a hash value Codehash of the contract, and the root StorageRoot of the contract storage) appears on the blockchain network and has a specific address, and the contract code and account storage can be stored in the storage of the contract account, as shown in FIG. 9. Behavior of the smart contract is controlled by the contract code, and the account storage of the smart contract keeps a contract status. In other words, the smart contract causes a virtual account including the contract code and account storage to be generated on the blockchain network. For a contract deployment transaction or a contract update transaction, the value of Codehash will be generated or changed. Subsequently, the blockchain node can receive a transaction request for invoking a deployed smart contract, and the transaction request can include an address of the invoked contract, a function in the invoked contract, and an entered parameter. Generally, after consensus is reached on the transaction request, each node in the blockchain network can independently execute the specified smart contract for invoking. For example, as shown in FIG. 9, a node can load a bytecode of a contract from storage into a virtual machine (EVM/WASM) based on an address of the contract. Further, an interpreter interprets and executes the bytecode, for example, parsing a bytecode of an invoked contract to obtain OPcodes, storing these OPcodes in a memory of the virtual machine, and further obtaining an address of an invoked function. After the Gas that needs to be consumed for executing the contract is calculated and the Gas is sufficient, the OPcode of the invoked function is obtained by jumping to a corresponding address of the memory, and execution is started. An operation such as data computation, push-in/push-out stack, etc., is performed on data operated by the OPcode of the invoked function, so as to complete data computation. In this process, some contract context information, such as a block number and information about an initiator for invoking a contract, can also be required. This information can be obtained from the context (Get operation). Finally, a resulting state is stored in the storage by invoking a storage interface. It should be noted that, in the process of creating a contract, interpretation execution of some functions in the contract can be generated, for example, a function of an initialization operation. In this case, a code is also parsed, a jump instruction is generated and stored in the memory, and data is operated in Stack. In the above interpretation execution process, generally, a function that is repeatedly executed is not cached, and even for a function executed for a plurality of times, a virtual machine needs to repeatedly perform a parsing and execution process.

Figure 8:
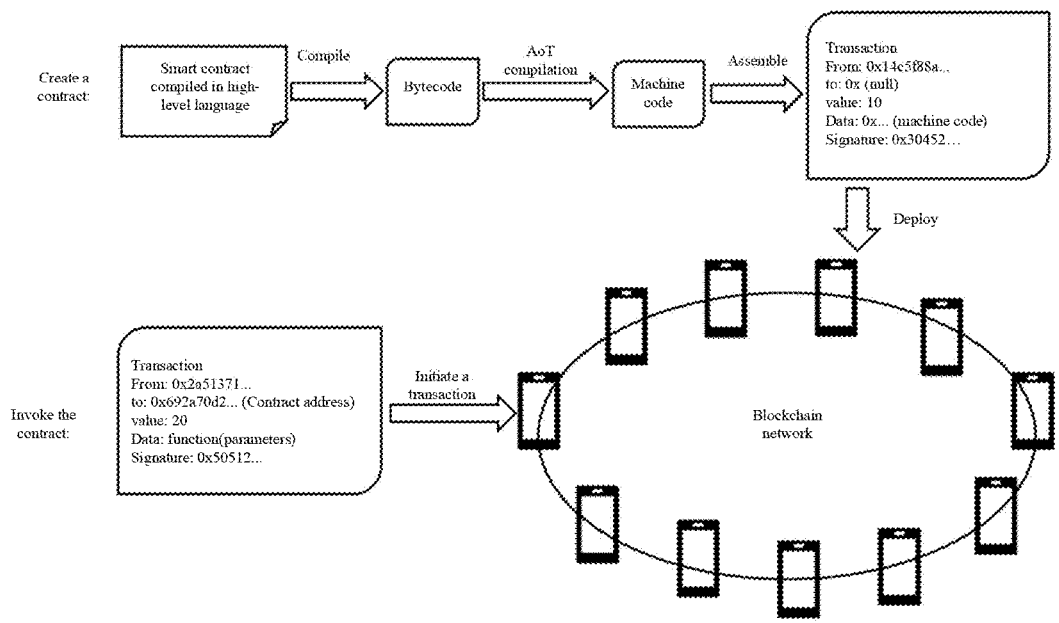
FIG. 8 is a schematic diagram of creating a smart contract and invoking the smart contract according to an implementation.

With regard to the cross-platform portability advantage of the JVM and performance improvement needs mentioned above, similarly, the EVM in the blockchain can also use technologies such as JIT and AoT to improve performance in execution of a smart contract. For example, before a smart contract is deployed on a blockchain, AoT compilation is performed to publish a compiled machine code to the blockchain, so as to complete contract deployment, for example, a process is shown in FIG. 8. A deployed contract can have a specific address on the blockchain. As such, a client-initiated transaction for creating a contract can include a machine code of the contract. For example, a client can compile a smart contract written in a high-level language into a bytecode, and then AoT compilation is performed locally at the client to obtain a machine code. A process of executing a contract on a blockchain (or referred to as a process of invoking a smart contract), for example, can be that a client (which can be different from a client that creates the smart contract) directly invokes and executes a machine code on the blockchain that has been compiled by using AoT compilation. Herein, in a transaction for invoking a contract, generally an address pointed to (that is, an address indicated by a "to" field) can be an address of the invoked contract. Because AoT compilation in this example is done prior to the smart contract being published on the blockchain, it can be referred to as "off-chain AoT." An off-chain AoT compilation process can perform a large quantity of code optimization, so efficiency of executing a contract on the blockchain can be greatly improved. However, a disadvantage is also obvious: A processor architecture, a running environment, etc., of a target node for deployment needs to be obtained in advance during off-chain AoT compilation. Otherwise, the machine code published on the blockchain is unable to be executed on the target node subsequently. In addition, to adapt to various different target nodes, multiple different machine codes need to be compiled by using AoT compilation. In this case, a size of a machine code compiled by using AoT compilation is far greater than a size of an original bytecode of a smart contract, which increases a quantity of data published on the blockchain and increases storage overheads.

Figure 6:
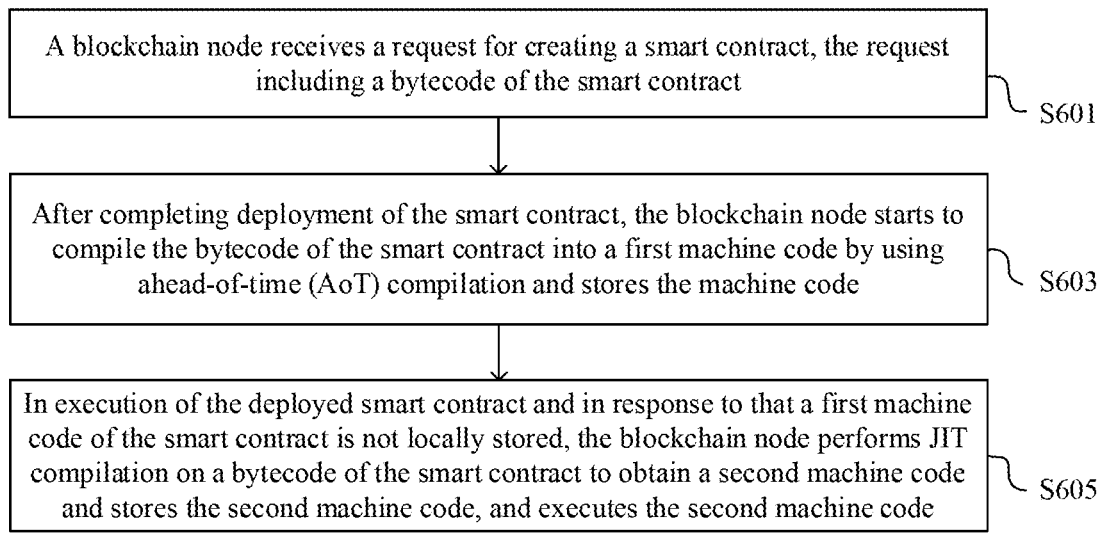
FIG. 6 is a flowchart of executing a smart contract according to an implementation.

The present specification provides an implementation of a method for executing a smart contract. As shown in FIG. 6, the method includes the following steps:

S601. A blockchain node receives a request for creating a smart contract, the request including a bytecode of the smart contract.

A user can write a smart contract in a high-level language locally. The written smart contract can be compiled by a compiler adapted to the high-level language to obtain a bytecode. Further, the bytecode of the compiled smart contract can be packaged into a transaction by using a client, and sent to a blockchain network. A format of the transaction is, for example, shown in FIG. 3 to FIG. 5. A bytecode of a smart contract that needs to be created can be stored in a "data" field of the transaction.

The user can also directly write a smart contract in a first blockchain node by using a high-level language. In this case, the first blockchain node can further compile the smart contract written in the high-level language by using a compiler to generate a bytecode. As such, the contract before being published to the blockchain is also a bytecode.

S603. After completing deployment of the smart contract, the blockchain node starts to compile the bytecode of the smart contract into a first machine code by using AoT compilation and stores the first machine code.

In Ethereum and a public blockchain, a consortium blockchain or a private blockchain system with similar principles, the blockchain node can initiate consensus on a batch of transactions. The batch of transactions can include the above transaction for creating a smart contract. After consensus is reached, generally, each consensus node locally stores a bytecode of the to-be-created smart contract. Each consensus node can locally execute the transaction for creating a smart contract, and create a corresponding contract account; and create an address for the contract account according to the same rule. Addresses created by consensus nodes for the same contract are the same. As such, contract deployment is completed.

After the blockchain node completes creating the smart contract, that is, after deploying the smart contract, the blockchain node can start to compile the bytecode of the smart contract into a first machine code by using AoT compilation and store the first machine code. After creating the smart contract, the blockchain node can immediately start to perform AoT compilation on the bytecode of the smart contract. This is because, soon after a smart contract is deployed, there can be a service request initiated to invoke the deployed smart contract. In addition, AoT needs to consume relatively more system resources and time. When a service load of a blockchain node is relatively heavy, allocating system resources for AoT compilation affects service processing. Therefore, the blockchain node can also perform AoT compilation on the bytecode of the smart contract within a relatively idle time period, thereby reducing or avoiding impact on service processing.

Each node in the blockchain performs AoT compilation locally for a bytecode of the same smart contract, and each node only needs to adjust its processor architecture, running environment, etc., and does not need to compile multiple different versions of first machine codes. As such, a size of a first machine code stored on a node device is greatly reduced, so storage overheads can be reduced.

In some embodiments, the storage is a cache, and a response can be made more quickly by caching the machine code to a memory. For example, the memory can be a cache area created in a virtual machine. Certainly, even if the machine code is stored to a disk, a response speed can be improved to a certain extent in many scenarios. an EVM in the blockchain uses the AoT technology to improve performance in execution of the smart contract. For example, compilation can be performed with reference to association of program codes, and an optimized and compiled machine code is cached for subsequent invoking. The optimized and compiled machine code is generally executed more efficiently than the directly interpreted machine code. In one aspect, an AoT engine can carry hardware and environment information of a blockchain node that executes compilation, so the compiled machine code undergoes hardware+environment optimization, which can for example include optimization in machine code generation, including instruction level optimization, register allocation, and optimization. In another aspect, the AoT engine can analyze context information, for example, a jump statement of a branch executed in a current function; and identify a statement in which jump can be the most likely to be performed, so as to adjust the statement to the headmost position, so as to first hit the statement of the branch at a higher probability in execution. The compiler optimization process can further perform dead code cancellation by using data stream analysis/active variable analysis, for example, eliminating branches that are not to be reached, and can further include optimizing a loop statement, and replacing a common word expression.

S605. In execution of a deployed smart contract and in response to a first machine code of the smart contract not being locally stored, the blockchain node performs JIT compilation on a bytecode of the smart contract to obtain a second machine code and caches the second machine code, and executes the second machine code.

After a smart contract is deployed, the contract is available for invoking. As such, a client (which can be different from the client initiating the transaction for creating a contract in S601) can initiate invoking to the contract. For example, the client initiates a transaction in which a "to" field is an address of the previously deployed smart contract, and a "data" field can include a method and an entered parameter of the invoked contract, so as to invoke the deployed smart contract. Generally, after consensus is reached on a batch of transactions including the transaction for invoking the contract, each consensus node performs the transaction separately.

When executing the deployed smart contract, the blockchain node can first check whether a first machine code of the invoked contract exists locally. The blockchain node can perform JIT compilation on the bytecode of the deployed smart contract without waiting for completion of AoT compilation if the first machine code of the smart contract is not locally stored. AoT compilation is more time-consuming and JIT compilation is less time-consuming. When AoT compilation is not completed, JIT compilation and execution are performed on the bytecode of the smart contract, so normal processing of a blockchain service request can be ensured while AoT compilation is performed.

JIT compilation herein mainly includes hotspot code identification. The method of identifying and caching the hotspot code can be used, so in the process of executing the bytecode for multiple times in the AoT compilation time period, the bytecode only needs to be interpreted for the first time, and a cached machine code can be directly used subsequently because the machine code obtained in the interpretation for the first time is cached, thereby avoiding a process of re-interpreting the bytecode and reducing time. For example, a code counter of the JIT engine counts a quantity of execution times, so as to analyze which bytecodes are executed for multiple times, and therefore cache the translated machine codes thereof. An operation executed for a relatively small quantity of times does not need to be cached. As such, optimal balance can be achieved between execution efficiency and memory overhead. The method of identifying and caching the hotspot code can be used, so in the process of executing the bytecode for multiple times, the bytecode only needs to be interpreted for the first time, and a cached machine code can be directly used subsequently, thereby avoiding a process of re-interpreting the bytecode and reducing time. A granularity for identifying a quantity of execution times may be a function level, or may be a code block level. In general, a code block may be a part of a function or may be composed of several functions.

Second, further optimization can be performed in JIT compilation, compilation is performed in combination with the context and/or association of program codes, and a machine code obtained after optimizing compilation is cached for subsequent invoking. The optimized and compiled machine code is generally executed more efficiently than the directly interpreted machine code. In one aspect, a JIT engine can carry hardware and environment information of a blockchain node that executes compilation, so the compiled machine code undergoes hardware+environment optimization, which can, for example, include optimization in machine code generation, including instruction level optimization, register allocation, and optimization. In another aspect, the JIT engine can analyze context information, for example, a jump statement of a branch executed in a current function; and identify a statement in which jump can be the most likely to be performed, so as to adjust the statement to the headmost position, so as to first hit the statement of the branch at a higher probability in execution. The compiler optimization process can further perform dead code cancellation by using data stream analysis/active variable analysis, for example, eliminating branches that are not to be reached, and can further include optimizing a loop statement, and replacing a common word expression.

To respond to a service request in a timely method, that is, quickly respond to a service request initiated for invoking a deployed smart contract, the blockchain node can first query whether a first machine code of the invoked smart contract exists. If the first machine code exists, it indicates that AoT compilation has been completed. If the first machine code does not exist, it indicates that AoT compilation has not been started or completed. If the first machine code exists, as described above, the blockchain node can execute the first machine code in executing the deployed smart contract, thereby greatly increasing the speed of executing the smart contract. If the first machine code does not exist, the blockchain node further queries a current AoT compilation status of the bytecode of the smart contract, which can, for example, include two scenarios:

Scenario 1: When executing the deployed smart contract, the blockchain node queries the current AoT compilation status of the bytecode of the smart contract in response to that the first machine code of the smart contract is not locally stored; and in response to that the bytecode is in AoT compilation, performs JIT compilation on the bytecode of the smart contract.

If the first machine code of the smart contract is not locally stored, the blockchain node can query the current AoT compilation status of the bytecode of the smart contract, and a query result can be that AoT compilation is ongoing. For some service requests that invoke the smart contract, a quick response is preferred, and this is also why various blockchain systems seek to increase transaction per second (TPS). When the invoked smart contract is undergoing AoT compilation, to quickly make a response, the blockchain node does not wait for completion of AoT compilation, but performs JIT compilation and execution on the bytecode of the smart contract.

Scenario 2: When executing the deployed smart contract, the blockchain node queries the current AoT compilation status of the bytecode of the smart contract in response to that the first machine code of the smart contract is not locally stored; and in response to that the bytecode is not in AoT compilation, starts AoT compilation and performs JIT compilation and execution on the bytecode of the smart contract.

Similar to scenario 1, when the invoked smart contract has not started AoT compilation, the blockchain node can perform JIT compilation and execution on the bytecode of the smart contract for making a quick response. In addition, when AoT compilation has not been started, the blockchain node can start AoT compilation.

The blockchain node performing JIT compilation on the bytecode of the smart contract may be interpreting the hotspot bytecode in the smart contract, and store (for example, cache) the interpreted second machine code for subsequent invoking. For example, a hotspot code can be identified in the process of at least one of interpreting or executing the bytecode of the smart contract, that is, to analyze which bytecode or second machine codes are executed for multiple times, so as to cache the interpreted second machine codes. An operation executed for a relatively small quantity of times does not need to be cached. As such, optimal balance can be achieved between execution efficiency and memory overhead. As described above, a granularity for identifying a quantity of execution times may be a function level, or may be a code block level. In general, a code block may be a part of a function or may be composed of several functions. Second, further optimization can be performed in JIT compilation, compilation is performed in combination with association of program codes, and a second machine code obtained after optimizing compilation is cached for subsequent invoking. The optimized and compiled machine code is generally executed more efficiently than the directly interpreted machine code.

After completing AoT compilation on the smart contract, the blockchain node can perform a storage operation on the compiled first machine code. As such, when the blockchain node executes the deployed smart contract, if a first machine code of the invoked contract locally exists, it indicates that AoT compilation on the bytecode of the smart contract has been completed locally. Further, the blockchain node can directly execute a first machine code of a corresponding invoked function in the contract, and input the input parameter specified in the above "data" field.

When the first machine code of the smart contract is stored, because the machine code itself is directly executable by a CPU under control of an OS, the blockchain node can greatly increase a speed of executing the smart contract. In addition, when the machine code of the smart contract is cached in the memory, the execution speed of the smart contract can be further increased. Certainly, even if the machine code is stored in a disk, the execution speed can be increased to a certain extent. The blockchain node executing the first machine code can be for example executing the stored first machine code corresponding to the invoked function in the smart contract.

In addition to an EVM, JIT compilation and execution in the present specification may also be applied to a Web assembly (WASM) virtual machine, a JavaScript virtual machine (JSVM), etc., which is not limited herein.

It should be noted that the blockchain node in S601 can be different from the blockchain node in S603 and S605. This is because the blockchain is a distributed system, and a node that receives a transaction, a node that initiates consensus, and a node that executes the transaction can be different nodes, or certainly can be a same node.

The following describes another implementation of a method for executing a smart contract according to the present specification, including:

Step A: After deploying a bytecode of a smart contract, a blockchain node starts to compile the bytecode of the smart contract into a first machine code by using AoT compilation and stores the first machine code.

The step that after deploying the bytecode of the smart contract, the blockchain node starts to compile the bytecode of the smart contract into the first machine code by using AoT compilation can, for example, include: starting, by the blockchain node after creating the smart contract, AoT compilation on the bytecode of the smart contract; or performing, by the blockchain node after creating the smart contract, AoT compilation on the bytecode of the smart contract within a relatively idle time period.

Step B: In execution of the deployed smart contract and in response to that a first machine code of the smart contract is not locally stored, the blockchain node performs JIT compilation on a bytecode of the smart contract to obtain a second machine code and stores the second machine code, and executes the second machine code.

That the blockchain node performs JIT compilation on the bytecode of the smart contract includes: the blockchain node performs JIT compilation on a bytecode corresponding to an invoked function in the contract.

The step that when executing the deployed smart contract, the blockchain node performs JIT compilation on the bytecode of the smart contract in response to that the first machine code of the smart contract is not locally stored can for example include:

When executing the deployed smart contract, the blockchain node queries a current AoT compilation status of the bytecode of the smart contract in response to that the first machine code of the smart contract is not locally stored; and in response to that the bytecode is in AoT compilation, performs JIT compilation on the bytecode of the smart contract; or when executing the deployed smart contract, the blockchain node queries a current AoT compilation status of the bytecode of the smart contract in response to that the first machine code of the smart contract is not locally stored; and in response to that the bytecode is not in AoT compilation, starts AoT compilation and performs JIT compilation on the bytecode of the smart contract.

The performing JIT compilation on the bytecode of the smart contract to obtain the second machine code and storing the second machine code includes at least one of: in the process of at least one of interpreting or executing the bytecode of the smart contract, identifying a hotspot second machine code, and storing the hotspot second machine code for subsequent invoking or performing optimizing compilation to obtain the second machine code and store the second machine code in the process of at least one of interpreting or executing the bytecode of the smart contract.

In execution of the deployed smart contract, the blockchain node executes a first machine code of the smart contract in response to that the first machine code is locally stored.

That the blockchain node executes the first machine code includes:

The blockchain node executes the stored first machine code corresponding to an invoked function in the contract.

An example method of the above storage can be caching. By caching the machine code to a memory, subsequently a response can be made more quickly. Certainly, even if the machine code is stored to a disk, a response speed can be improved to a certain extent in many scenarios.

Figure 7:
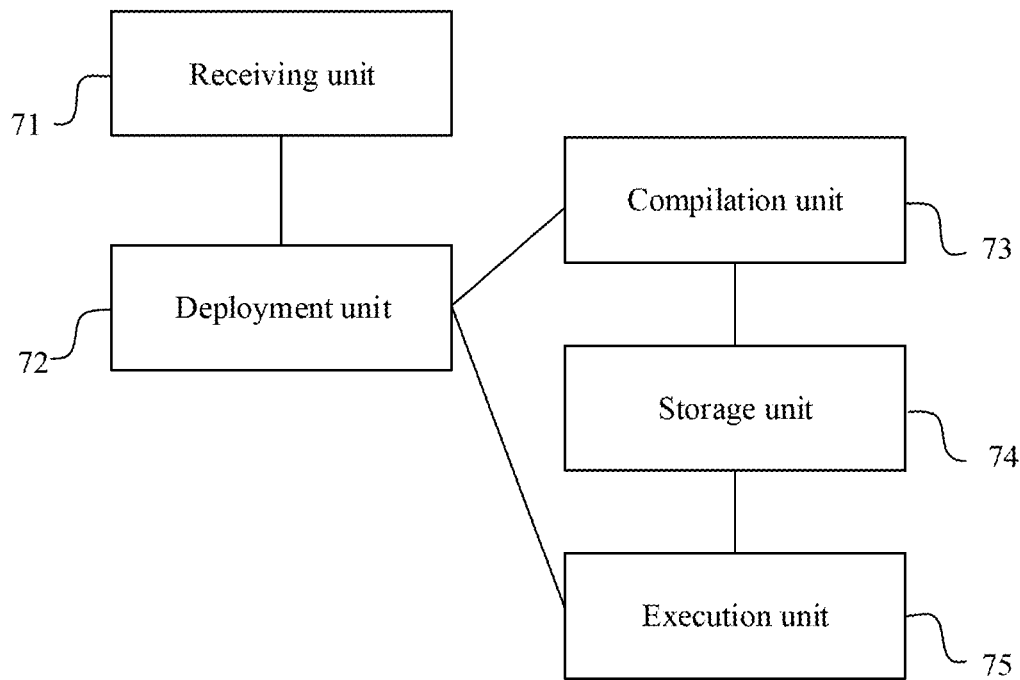
FIG. 7 is a structural module diagram illustrating a blockchain node according to an implementation.

The following describes an implementation of a blockchain node for executing a smart contract according to the present specification. As shown in FIG. 7, the blockchain node includes: a receiving unit 71, configured to: receive a request for creating a smart contract, the request including a bytecode of the smart contract; a deployment unit 72, configured to deploy the smart contract according to the request for creating a smart contract received by the receiving unit 71; a compilation unit 73, configured to: after the deployment unit 72 completes deployment, start to compile the bytecode of the smart contract into a first machine code by using AoT compilation; a storage unit 74, configured to store the first machine code compiled by the compilation unit 73 or a second machine code compiled by an execution unit 75; and the execution unit 75, configured to: perform, in execution of the deployed smart contract and in response to that a first machine code of the smart contract is not locally stored, JIT compilation on a bytecode of the smart contract to obtain a second machine code and store the second machine code, and execute the second machine code.

After the deployment unit 72 completes deployment of the smart contract, that the compilation unit 73 starts to compile the bytecode of the smart contract into the machine code by using AoT compilation for example includes:

After the deployment unit 72 completes creating the smart contract, the compilation unit 73 starts to perform AoT compilation on the bytecode of the smart contract; or after the deployment unit 72 completes creating the smart contract, the compilation unit 73 performs AoT compilation on the bytecode of the smart contract within a relatively idle time period.

The storage unit 74 can be a memory or a disk storage.

If the storage unit 74 stores the first machine code or the second machine code of the smart contract, the execution unit 75 preferentially executes the stored first machine code of the corresponding invoked function in the contract, and performs the stored second machine code of the corresponding invoked function in the contract in the absence of the first machine code. If the storage unit 74 has neither the first machine code nor the second machine code, the execution unit 75 performs JIT compilation on the bytecode of the smart contract to obtain the second machine code and store the second machine code, and executes the second machine code.

That the execution unit 75 performs JIT compilation on the bytecode of the smart contract includes:

The execution unit 75 performs JIT compilation on the bytecode corresponding to the invoked function in the contract.

When the execution unit 75 executes the deployed smart contract, if the storage unit 74 does not store the first machine code of the smart contract, the execution unit 75 performs JIT compilation and execution on the bytecode of the smart contract, for example, includes:

When executing the deployed smart contract, the blockchain node queries a current AoT compilation status of the bytecode of the smart contract in response to the first machine code of the smart contract not being locally stored; and in response to the bytecode being in AoT compilation, performs JIT compilation on the bytecode of the smart contract; or when executing the deployed smart contract, the blockchain node queries a current AoT compilation status of the bytecode of the smart contract in response to the first machine code of the smart contract not being locally stored; and in response to the bytecode not being in AoT compilation, starts AoT compilation and performs JIT compilation on the bytecode of the smart contract.

That the execution unit 75 performs JIT compilation on the bytecode of the smart contract to obtain the second machine code and store the second machine code includes at least one of: in the process of at least one of interpreting or executing the bytecode of the smart contract, the execution unit 75 identifies a hotspot second machine code, and stores the hotspot second machine code for subsequent invoking; or performs optimizing compilation to obtain the second machine code and store the second machine code in the process of at least one of interpreting or executing the bytecode of the smart contract.

In execution of the deployed smart contract, the execution unit 75 executes a first machine code of the smart contract in response to that the first machine code is locally stored.

That the execution unit 75 executes the first machine code includes:

The blockchain node executes the stored first machine code corresponding to an invoked function in the contract.

In addition, the blockchain node that executes the smart contract can also perform the method in step A and step B.

The present specification further provides an implementation of a blockchain node, including: a processor; and a memory storing a program, where a smart contract is executed in the above method when the processor executes the program.

The present specification further provides a storage medium implementation, configured to store a program, where the program executes the above method when being executed.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 11:
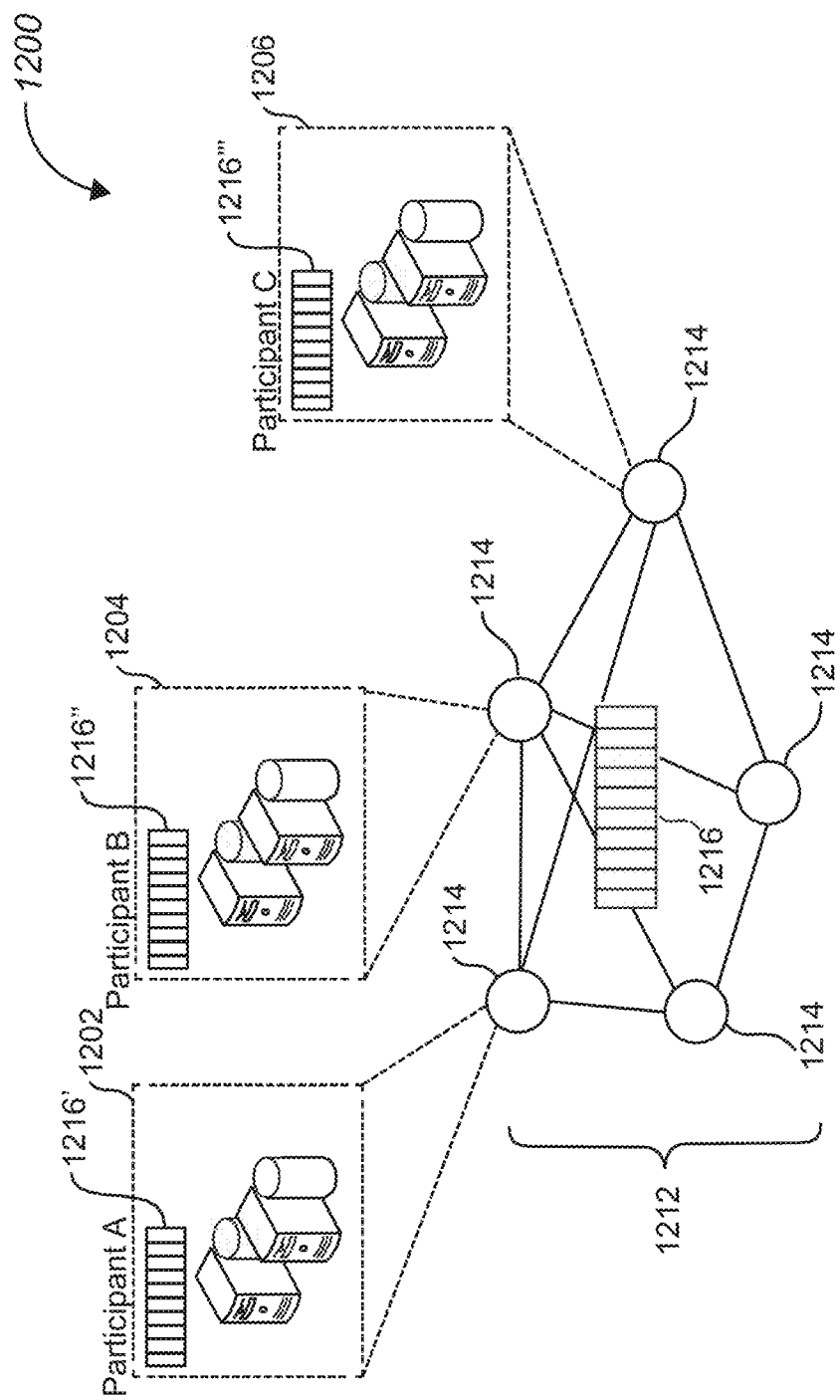
FIG. 11 is a diagram illustrating an example architecture in accordance with embodiments of this specification.

FIG. 11 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 11, the consortium blockchain network 1102 is represented as a peer-to-peer network of nodes, and the computing systems 1106, 1108 provide nodes of the first entity and second entity, respectively, which participate in the consortium blockchain network 1102.

FIG. 12 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 12, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 12, the participant systems 1202, 1204 store respective, complete copies 1216', 1216", 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes." The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 12, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 12, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 12, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In the 1990s, whether technology improvement is hardware improvement (for example, improvement of a circuit structure, such as a diode, a transistor, or a switch) or software improvement (improvement of a method procedure) can be clearly distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device configured to implement various functions in the controller can also be considered as a structure in the hardware component. Alternatively or additionally, the device configured to implement various functions can even be considered as both a software module implementing the method and a structure in the hardware component.

The system, apparatus, module, or unit illustrated in the implementations can be implemented by using a computer chip or an entity, or can be implemented by using a product having a certain function. A typical implementation device is a server system. Certainly, with development of computer technologies in the future, a computer that implements a function of the above implementation can be, a personal computer, a laptop computer, a cellular phone, a camera phone, a smartphone, a personal digital assistant, a media player, a navigation device, an email device, a game console, a tablet computer, or a wearable device, or a combination of any of these devices.

Although the one or more implementations of the present specification provide the operation steps of the method according to an implementation or a flowchart, the conventional or non-creative means can include more or fewer operation steps. A sequence of the steps listed in the implementation is merely one of numerous execution sequences of the steps, and does not represent a unique execution sequence. In actual execution of an apparatus or a terminal product, execution can be performed based on a method sequence shown in the implementations or the accompanying drawings, or performed in parallel (for example, a parallel processor or a multi-thread processing environment, or even a distributed data processing environment). Terms "include," "contain," or their any other variant is intended to cover non-exclusive inclusion, so a process, a method, an article, or a device that includes a series of elements not only includes these very elements, but also includes other elements which are not expressly listed, or further includes elements inherent to such process, method, article, or device. An element preceded by "includes a . . . " does not, without more constraints, preclude the existence of additional identical elements in the process, method, article, or device that includes the element. For example, the words such as "first" and "second" are used to indicate names instead of any particular order.

For ease of description, the above device is described by dividing functions into various modules. Certainly, when the one or more implementations of the present specification are implemented, the functions of each module can be implemented in one or more pieces of software and/or hardware, or a module implementing a same function can be implemented by a combination of a plurality of submodules or subunits. The described apparatus implementation is merely an example. For example, the unit division is merely logical function division and can be other division in actual implementation. For example, a plurality of units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

The present specification is described with reference to at least one of a flowchart or block diagram of the method, apparatus (system), and computer program product according to the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. A computer storage medium includes but is not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission medium. The computer storage medium can be used to store information that can be accessed by the computing device. Based on the definition in the present specification, the computer readable medium does not include transitory media such as a modulated data signal and carrier.

A person skilled in the art should understand that one or more implementations of the present specification can be provided as a method, a system, or a computer program product. Therefore, one or more implementations of the present specification can use a form of hardware only implementations, software only implementation, or implementations with a combination of software and hardware. In addition, one or more implementations of the present specification can use a form of a computer program product that is implemented on one or more computer-usable storage media (including but not limited to a disk memory, a CD-ROM, an optical memory, etc.) that include computer-usable program code.

One or more implementations of the present specification can be described in the general context of computer-executable instructions, for example, a program module. Generally, the program module includes a routine, a program, an object, a component, a data structure, etc., executing a specific task or implementing a specific abstract data type. The one or more implementations of the present specification can also be practiced in distributed computing environments. In these distributed computing environments, tasks are executed by remote processing devices that are connected by using a communications network. In a distributed computing environment, the program module can be located in both local and remote computer storage media including storage devices.

The implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to related descriptions in the method implementation. In descriptions in the present specification, descriptions about such reference terms as "an implementation," "some implementations," "an example," "a specific example," and "some examples" mean that specific features, structures, materials, or characteristics described with reference to the implementations or examples are included in at least one implementation or example of the present specification. In the present specification, the previous examples of the terms are not necessarily with respect to the same implementation or example. In addition, the described specific features, structures, materials, or characteristics can be combined in a proper way in any one or more of the implementations or examples. In addition, a person skilled in the art can integrate or combine different implementations or examples and characteristics of different implementations or examples described in the present specification, provided that they do not conflict with each other.

The previous descriptions are merely implementations of the one or more implementations of the present specification, and are not intended to limit the one or more implementations of the present specification. For a person skilled in the art, the one or more implementations of the present specification can have various modifications and changes. Any modification, equivalent replacement, or improvement made without departing from the spirit and principle of the present specification shall fall within the scope of the claims.

The various embodiments described above can be combined to provide further embodiments. Aspects of the embodiments can be modified, if necessary, to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for executing a smart contract, comprising:
   starting, by a blockchain node of a blockchain network after a smart contract of bytecodes has been deployed in the blockchain network, to compile a bytecode of the bytecodes of the smart contract into a first machine code by using ahead-of-time (AoT) compilation and storing the first machine code; and
   performing, by the blockchain node of the blockchain network in execution of the smart contract and in response to the first machine code of the smart contract not being locally stored, just-in-time (JIT) compilation on a bytecode of the bytecodes of the smart contract to obtain a second machine code and storing the second machine code, and executing the second machine code,
   wherein the performing, by the blockchain node of the blockchain network in the execution of the smart contract and in response to the first machine code of the smart contract not being locally stored, JIT compilation on the bytecode of the bytecodes of the smart contract includes:
      querying, by the blockchain node of the blockchain network in the execution of the smart contract, a current AoT compilation status of the bytecode of the bytecodes of the smart contract in response to the first machine code of the smart contract not being locally stored;
      in response to the bytecode of the bytecodes of the smart contract being in AoT compilation, performing JIT compilation on the bytecode of the bytecodes of the smart contract; and
      in response to the bytecode of the bytecodes of the smart contract not being in AoT compilation, starting AoT compilation and performing JIT compilation on the bytecode of the bytecodes of the smart contract.

2. The method according to claim 1, wherein the starting to compile the bytecode of the bytecodes of the smart contract into the first machine code by using AoT compilation includes:
   starting, by the blockchain node after the smart contract has been deployed in the blockchain network, AoT compilation on the bytecode of the bytecodes of the smart contract; or
   performing, by the blockchain node after the smart contract has been deployed in the blockchain network, AoT compilation on the bytecode of the bytecodes of the smart contract within a determined idle time period.

3. The method according to claim 1, wherein the performing, by the blockchain node of the blockchain network in execution of the smart contract and in response to the first machine code of the smart contract not being locally stored, JIT compilation on the bytecode of the bytecodes of the smart contract to obtain the second machine code and storing the second machine code includes:
   performing, by the blockchain node of the blockchain network in execution of the smart contract and in response to the first machine code of the smart contract not being locally stored, JIT compilation on a bytecode corresponding to an invoked function in the smart contract.

4. The method according to claim 1, wherein the performing, by the blockchain node of the blockchain network in execution of the smart contract and in response to the first machine code of the smart contract not being locally stored, JIT compilation on the bytecode of the bytecodes of the smart contract to obtain the second machine code and storing the second machine code includes at least one of:
   in a process of at least one of interpreting or executing the bytecode of the bytecodes of the smart contract, identifying a hotspot second machine code, and storing the hotspot second machine code for subsequent invoking; or
   performing optimizing compilation to obtain the second machine code and storing the second machine code in the process of at least one of interpreting or executing the bytecode of the bytecodes of the smart contract.

5. The method according to claim 1, further comprising:
   in execution of the smart contract, executing, by the blockchain node of the blockchain network, the first machine code of the smart contract in response to the first machine code of the smart contract being locally stored.

6. The method according to claim 5, wherein the executing, by the blockchain node of the blockchain network, the first machine code of the smart contract includes:
   executing, by the blockchain node of the blockchain network, the stored first machine code of the smart contract corresponding to an invoked function in the smart contract.

7. The method according to claim 1, wherein the storing is caching.

8. The method according to claim 1, further comprising:
   receiving, by the blockchain node of the blockchain network, a request for deploying the smart contract in the blockchain network, wherein the request includes the bytecodes of the smart contract; and
   causing, by the blockchain node of the blockchain network, deployment of the smart contract in the blockchain network.

9. A blockchain node for executing a smart contract, comprising:
   a processor; and
   a memory coupled to the processor and having executable instructions stored thereon that are executable by the processor to perform acts including:
   starting, by a blockchain node of a blockchain network after a smart contract of bytecodes has been deployed in the blockchain network, to compile a bytecode of the bytecodes of the smart contract into a first machine code by using ahead-of-time (AoT) compilation and storing the first machine code; and performing, by the blockchain node of the blockchain network in execution of the smart contract and in response to the first machine code of the smart contract not being locally stored, just-in-time (JIT) compilation on a bytecode of the bytecodes of the smart contract to obtain a second machine code and storing the second machine code, and executing the second machine code, wherein the performing, by the blockchain node of the blockchain network in the execution of the smart contract and in response to the first machine code of the smart contract not being locally stored, JIT compilation on the bytecode of the bytecodes of the smart contract includes:

querying, by the blockchain node of the blockchain network in the execution of the smart contract, a current AoT compilation status of the bytecode of the bytecodes of the smart contract in response to the first machine code of the smart contract not being locally stored;

in response to the bytecode of the bytecodes of the smart contract being in AoT compilation, performing JIT compilation on the bytecode of the bytecodes of the smart contract; and in response to the bytecode of the bytecodes of the smart contract not being in AoT compilation, starting AoT compilation and performing JIT compilation on the bytecode of the bytecodes of the smart contract.

10. The blockchain node according to claim 9, wherein the starting to compile the bytecode of the bytecodes of the smart contract into the first machine code by using AoT compilation includes:

starting, by the blockchain node after the smart contract has been deployed in the blockchain network, AoT compilation on the bytecode of the bytecodes of the smart contract; or performing, by the blockchain node after the smart contract has been deployed in the blockchain network, AoT compilation on the bytecode of the bytecodes of the smart contract within a determined idle time period.

11. The blockchain node according to claim 9, wherein the performing, by the blockchain node of the blockchain network in execution of the smart contract and in response to the first machine code of the smart contract not being locally stored, JIT compilation on the bytecode of the bytecodes of the smart contract to obtain the second machine code and storing the second machine code includes:

performing, by the blockchain node of the blockchain network in execution of the smart contract and in response to the first machine code of the smart contract not being locally stored, JIT compilation on a bytecode corresponding to an invoked function in the smart contract.

12. The blockchain node according to claim 9, wherein the performing, by the blockchain node of the blockchain network in execution of the smart contract and in response to the first machine code of the smart contract not being locally stored, JIT compilation on the bytecode of the bytecodes of the smart contract to obtain the second machine code and storing the second machine code includes at least one of:

in a process of at least one of interpreting or executing the bytecode of the bytecodes of the smart contract, identifying a hotspot second machine code, and storing the hotspot second machine code for subsequent invoking; or performing optimizing compilation to obtain the second machine code and storing the second machine code in the process of at least one of interpreting or executing the bytecode of the bytecodes of the smart contract.

13. The blockchain node according to claim 9, wherein the acts further include:

in execution of the smart contract, executing, by the blockchain node of the blockchain network, the first machine code of the smart contract in response to the first machine code of the smart contract being locally stored.

14. The blockchain node according to claim 13, wherein the executing, by the blockchain node of the blockchain network, the first machine code of the smart contract includes:

executing, by the blockchain node of the blockchain network, the stored first machine code of the smart contract corresponding to an invoked function in the smart contract.

15. The blockchain node according to claim 9, wherein the storing is caching.

16. The blockchain node according to claim 9, wherein the acts further include:

receiving, by the blockchain node of the blockchain network, a request for deploying the smart contract in the blockchain network, wherein the request includes the bytecodes of the smart contract; and causing, by the blockchain node of the blockchain network, deployment of the smart contract in the blockchain network.

17. A non-transitory computer storage medium, the storage medium having executable instructions stored thereon that are executable by one or more processors to perform acts including:

starting, by a blockchain node of a blockchain network after a smart contract of bytecodes has been deployed in the blockchain network, to compile a bytecode of the bytecodes of the smart contract into a first machine code by using ahead-of-time (AoT) compilation and storing the first machine code; and performing, by the blockchain node of the blockchain network in execution of the smart contract and in response to the first machine code of the smart contract not being locally stored, just-in-time (JIT) compilation on a bytecode of the bytecodes of the smart contract to obtain a second machine code and storing the second machine code, and executing the second machine code, wherein the performing, by the blockchain node of the blockchain network in the execution of the smart contract and in response to the first machine code of the smart contract not being locally stored, JIT compilation on the bytecode of the bytecodes of the smart contract includes:

querying, by the blockchain node of the blockchain network in the execution of the smart contract, a current AoT compilation status of the bytecode of the bytecodes of the smart contract in response to the first machine code of the smart contract not being locally stored;

in response to the bytecode of the bytecodes of the smart contract being in AoT compilation, performing JIT compilation on the bytecode of the bytecodes of the smart contract; and in response to the bytecode of the bytecodes of the smart contract not being in AoT compilation, starting AoT compilation and performing JIT compilation on the bytecode of the bytecodes of the smart contract.

18. The non-transitory computer storage medium according to claim 17, wherein the starting to compile the bytecode of the bytecodes of the smart contract into the first machine code by using AoT compilation includes:
  starting, by the blockchain node after the smart contract has been deployed in the blockchain network, AoT compilation on the bytecode of the bytecodes of the smart contract; or
  performing, by the blockchain node after the smart contract has been deployed in the blockchain network, AoT compilation on the bytecode of the bytecodes of the smart contract within a determined idle time period.

19. The non-transitory computer storage medium according to claim 17, wherein the performing, by the blockchain node of the blockchain network in execution of the smart contract and in response to the first machine code of the smart contract not being locally stored, JIT compilation on the bytecode of the bytecodes of the smart contract to obtain the second machine code and storing the second machine code includes:
  performing, by the blockchain node of the blockchain network in execution of the smart contract and in response to the first machine code of the smart contract not being locally stored, JIT compilation on a bytecode corresponding to an invoked function in the smart contract.

20. The non-transitory computer storage medium according to claim 17, wherein the performing, by the blockchain node of the blockchain network in execution of the smart contract and in response to the first machine code of the smart contract not being locally stored, JIT compilation on the bytecode of the bytecodes of the smart contract to obtain the second machine code and storing the second machine code includes at least one of:
  in a process of at least one of interpreting or executing the bytecode of the bytecodes of the smart contract, identifying a hotspot second machine code, and storing the hotspot second machine code for subsequent invoking; or
  performing optimizing compilation to obtain the second machine code and storing the second machine code in the process of at least one of interpreting or executing the bytecode of the bytecodes of the smart contract.

* * * * *